(12) United States Patent
Yoda et al.

(10) Patent No.: US 8,339,255 B2
(45) Date of Patent: Dec. 25, 2012

(54) DISPLAY SYSTEM, DISPLAY CONTROL DEVICE AND IMAGE DISPLAY DEVICE

(75) Inventors: Kazuhiko Yoda, Osaka (JP); Masayuki Fujisawa, Osaka (JP); Fumiaki Fujimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 414 days.

(21) Appl. No.: 12/810,910

(22) PCT Filed: Nov. 14, 2008

(86) PCT No.: PCT/JP2008/070771
§ 371 (c)(1),
(2), (4) Date: Jun. 28, 2010

(87) PCT Pub. No.: WO2009/093371
PCT Pub. Date: Jul. 30, 2009

(65) Prior Publication Data
US 2010/0283597 A1 Nov. 11, 2010

(30) Foreign Application Priority Data
Jan. 22, 2008 (JP) ................................ 2008-012034

(51) Int. Cl.
*B60Q 1/00* (2006.01)
(52) U.S. Cl. ........ 340/461; 340/462; 345/619; 345/620; 345/625; 345/634; 345/638; 362/97.2; 348/113; 348/114; 348/115; 348/116; 348/117; 348/118; 348/142; 348/143
(58) Field of Classification Search .................. 340/461, 340/462; 345/619, 620, 625, 634, 638; 362/97.2; 348/113–118, 142, 143
See application file for complete search history.

(56) References Cited

U.S. PATENT DOCUMENTS
5,764,139 A 6/1998 Nojima et al.
(Continued)

FOREIGN PATENT DOCUMENTS
EP 1 800 959 A1 6/2007
(Continued)

OTHER PUBLICATIONS
Official Communication issued in International Patent Application No. PCT/JP2008/070771, mailed on Feb. 10, 2009.
(Continued)

*Primary Examiner* — George Bugg
*Assistant Examiner* — Ojiako Nwugo
(74) *Attorney, Agent, or Firm* — Keating & Bennett, LLP

(57) ABSTRACT

A display system of the present invention includes a liquid crystal platform section (200) which outputs display data for displaying, on a liquid crystal display section (100), an image in accordance with information obtained from an automobile. The liquid crystal platform section (200) includes a DIC (201) which generates display data and calculates a display position of the image to be displayed on the liquid crystal display section (100) from the obtained information and which causes the generated display data to be displayed in the calculated image display position. The DIC (201) updates display so that the image moves at frame intervals from a start position of image display to the image display position calculated from the automobile information currently obtained, when an interval at which the information is obtained is longer than each of the frame intervals for displaying the image. The start position is the image display position having been calculated from the information obtained immediately before the information currently obtained. This makes it possible to realize a display system including an image display device whose change in image can be reliably tracked by eyes of a driver (human being).

26 Claims, 8 Drawing Sheets

U.S. PATENT DOCUMENTS

| | | | |
|---|---|---|---|
| 6,463,363 B1 * | 10/2002 | Okuda | 701/1 |
| 2007/0126928 A1 * | 6/2007 | Klompnhouwer et al. | 348/497 |
| 2007/0146262 A1 | 6/2007 | Ogasawara et al. | |
| 2008/0309474 A1 | 12/2008 | Okamoto et al. | |
| 2009/0067509 A1 * | 3/2009 | Poon | 375/240.26 |
| 2009/0179745 A1 | 7/2009 | Okamoto et al. | |

FOREIGN PATENT DOCUMENTS

| | | |
|---|---|---|
| JP | 9-123848 A | 5/1997 |
| JP | 2000-324451 A | 11/2000 |
| JP | 2005-088673 A | 4/2005 |
| JP | 2005-345780 A | 12/2005 |
| JP | 2006-150999 A | 6/2006 |
| JP | 2006-234505 A | 9/2006 |
| JP | 2006-293901 A | 10/2006 |
| JP | 2007-147901 A | 6/2007 |
| JP | 2007-178179 A | 7/2007 |
| JP | 2008-189211 A | 8/2008 |
| JP | 2009-116043 A | 5/2009 |
| WO | 2006/022191 A1 | 3/2006 |

OTHER PUBLICATIONS

Hamachi et al. "Display System, Display Data Output Device, Display Control Device, Display Control Method, Display Control Program, and Computer-Readable Recording Medium"; U.S. Appl. No. 12/739,769, filed Apr. 26, 2010.

* cited by examiner

FIG. 4
DISPLAY METHOD 1 (HALF BY HALF PROCESS)
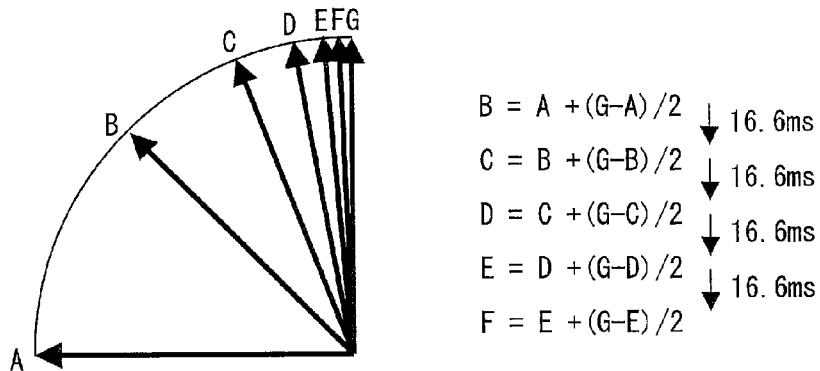
DISPLAY METHOD 2 (EQUALIZING PROCESS)
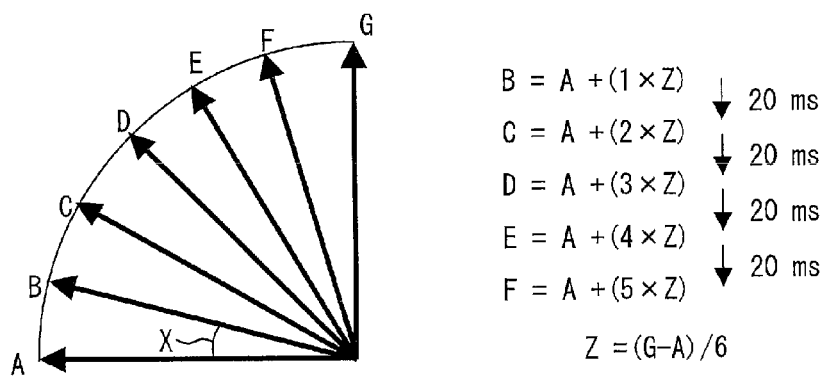

360 DEGREES × 3 (1 DEGREE IS DIVIDED INTO THREE) = 1080 DEGREES

FIG. 7

ROTATE COMMAND ISSUANCE

25 TIMES {
AFTER 20 ms → FIRST SMOOTHING ANGLE VALUE
 = INT(-270 + 5.4 × 1 + 0.5) = INT(-264.1) = -265Angle
AFTER 40 ms → SECOND SMOOTHING ANGLE VALUE
 = INT(-270 + 5.4 × 2 + 0.5) = INT(-258.7) = -259Angle
.
.
.
AFTER 500 ms → 25$^{TH}$ SMOOTHING ANGLE VALUE
 = INT(-270 + 5.4 × 25 + 0.5) = INT(-134.5) = -135Angle
}

↓

ISSUANCE STOPS UNTIL RECEPTION OF NEXT CAN MESSAGE.

FIG. 8

ROTATE COMMAND ISSUANCE

```
i=1;
REPEAT FOR EACH INTERVAL OF (1) {
    SMOOTHING ANGLE VALUE (i) = INT (Angle(T(n-1)) + (5) × i+ 0.5) ;
    CORRECTION IN RANGE OF 0 TO 1079 (SMOOTHING ANGLE VALUE(i));
    ROTATE COMMAND (SMOOTHING ANGLE VALUE(i));
    i++;
    if(i > (4))
        break;
}
```

DISPLAY SYSTEM, DISPLAY CONTROL DEVICE AND IMAGE DISPLAY DEVICE

TECHNICAL FIELD

The present invention relates to a display system mounted on a controllable moving body such as a vehicle, particularly to a technique for improving visibility of gauges.

BACKGROUND ART

A speedometer on an instrument panel is usually mounted on a controllable moving body such as an automobile so that an operator (driver) can visually check a running speed (speed) of the moving body (automobile) which the operator himself operates (drives).

Recently, a liquid crystal panel has been used for displaying various information (e.g. speed) regarding an automobile.

For example, Patent Literature 1 discloses a gauge which displays speed on a liquid crystal panel in an analog format. Patent Literature 1 describes, as an analog instrument, a gauge in which an indicator needle which rotates according to a speed is displayed as a moving image on the liquid crystal panel.

Further, recently, there has been proposed a display system including a display panel which is mounted on an instrument panel of an automobile or the like and which displays information, such as navigation information, for supporting driving in addition to the various information including speed regarding the automobile.

Such a display system includes, for example, a display system disclosed in Patent Literature 2. In the display system disclosed in Patent Literature 2, a display panel is connected to an in-vehicle network, a signal line, or the like and displays gauge information such as speed in accordance with information (value) that has been transmitted from the in-vehicle network, the signal line, or the like.

Patent Literature 1

Japanese Patent Application Publication, Tokukai, No. 2006-234505 A (Publication Date: Sep. 7, 2006)

Patent Literature 2

International Patent Application Publication, No. WO 2006/022191 A1 (Publication Date: Mar. 2, 2006)

SUMMARY OF INVENTION

However, for example, in a case where the gauge including the liquid crystal panel disclosed in Patent Literature 1 is applied to the display system disclosed in Patent Literature 2, a driver may not be able to recognize gauge information depending on transmission intervals of the value if the gauge information is displayed according to the value at the transmission intervals at which the value is transmitted from the in-vehicle network. This is because the transmission intervals are beyond tracking ability of eyes of human being.

This problem occurs, because timing (transmission intervals) at which a detected value (value transmitted from the in-vehicle network) is transmitted is not considered in an arrangement of the gauge disclosed in Patent Literature 1. In the gauge, an angle by which an indicator needle moves is calculated from the detected value and a display position of the indicator needle is determined, so that a created indicator needle image is displayed. Therefore, a display timing on the liquid crystal panel may not be identical with a detection timing of the detected value. Therefore, eyes of human being may not be able to track a change of the indicator needle image and consequently may not be able to reliably recognize the gauge information.

If, as described above, the eyes of human being cannot reliably recognize the gauge information displayed on the gauge including the liquid crystal panel, an accident may occur, for example. This is unfavorable in terms of safety.

The present invention is attained in view of the above problems, and an object of the present invention is to achieve (i) an image display device in which eyes of a driver (human being) can reliably track a state change of an image by taking into account an interval of information inputted into a display that is an image display section and a display property (frame intervals) of the display, and (ii) a display system including the image display device.

A display system of the present invention, to attain the object, is mounted on a moving body that is controllable, includes an image display device displaying, as an image, information regarding the moving body, and comprises: an image display section displaying the image; a display data generating section creating the image to be displayed on the image display section as display data, in accordance with the information obtained from the moving body; a display position calculating section calculating a display position of the image to be displayed on the image display section, from the information obtained from the moving body; and a display control section displaying the display data generated by the display data generating section, in the image display position on the image display section, the image display position calculated by the display position calculating section. The display control section, when an interval at which the information is obtained from the moving body is longer than each of frame intervals for displaying the image on the image display section, updates the image display position of the image so that the image moves at the frame intervals from a start position of image display to the image display position calculated by the display position calculating section from the information currently obtained regarding the moving body, the start position being the image display position having been calculated by the display position calculating section from the information obtained regarding the moving body immediately before the information currently obtained.

According to the configuration, when the interval at which the information is obtained from the moving body is longer than each of the frame intervals for the image display, the image display position of the image is updated so that the image moves at the frame intervals from the start position of the image display to the image display position calculated from the information currently obtained regarding the moving body. The start position is the image display position having been calculated from the information obtained regarding the moving body immediately before the currently obtained information. This allows interpolation display (interpolation) of the image at the frame intervals between the start position and the current display position.

Generally, the frame intervals which indicate display timing for a display image are set at intervals so that eyes of human being can recognize a change (such as a shift) of an image without a doubt. Therefore, as described above, if the interpolation of the image display is performed at the frame intervals, the eyes of human being can reliably track the shift (change) of the display image.

Accordingly, because the interpolation is performed, the eyes of human being can perceive a display image smoothly shifting.

It can be recognized that the display control section updates the image display position so that the image moves by an equal distance from the start position to the image display position calculated by the display position calculating section from the information currently obtained regarding the moving body.

If the display image is an image which indicates speed of a speedometer, an operator (driver) of the moving body perceives a running speed smoothly changing. As a result, the operator can always figure out the speed correctly. This leads to a safe driving.

If the display image is an image which indicates a needle in a case of the speedometer of a rotating meter, the indicator needle in accordance with the speed of the moving body can be always displayed.

It should be noted that, if the display image is a gauge that shows an amount of a state change by rotation of the indicator needle, the gauge is not limited to the speedometer, but may be a tachometer, a fuel gauge, a water temperature gauge or the like.

Similarly, if the display image is a level meter which indicates an amount of a state change in accordance with the information from the moving body, the level meter is not limited to the speedometer, but may be a tachometer, a fuel gauge, a water temperature gauge or the like.

That is to say, the display image may be arranged by a plurality of static images which indicate a level change of the level meter, and the display image may be displayed by updating a static image according to the information from the moving body.

The image display device may be a liquid crystal display device.

BRIEF DESCRIPTION OF DRAWINGS

FIG. 4 is a diagram for explaining two ways of smoothing in rotation display of an indicator needle image.

FIG. 7 shows a concrete example of ROTATE command issuance based on number of times of drawing calculated in FIG. 6 and a rotation angle of each ROTATE command.

FIG. 8 shows an example of a program in issuing a ROTATE command shown in FIG. 7.

DESCRIPTION OF EMBODIMENTS

The following describes an embodiment of the present invention.

The present embodiment describes an example in which a display system of the present invention is applied to a liquid crystal instrument panel system which is used as an instrument panel of an automobile which is an controllable moving body.

Figure 1:
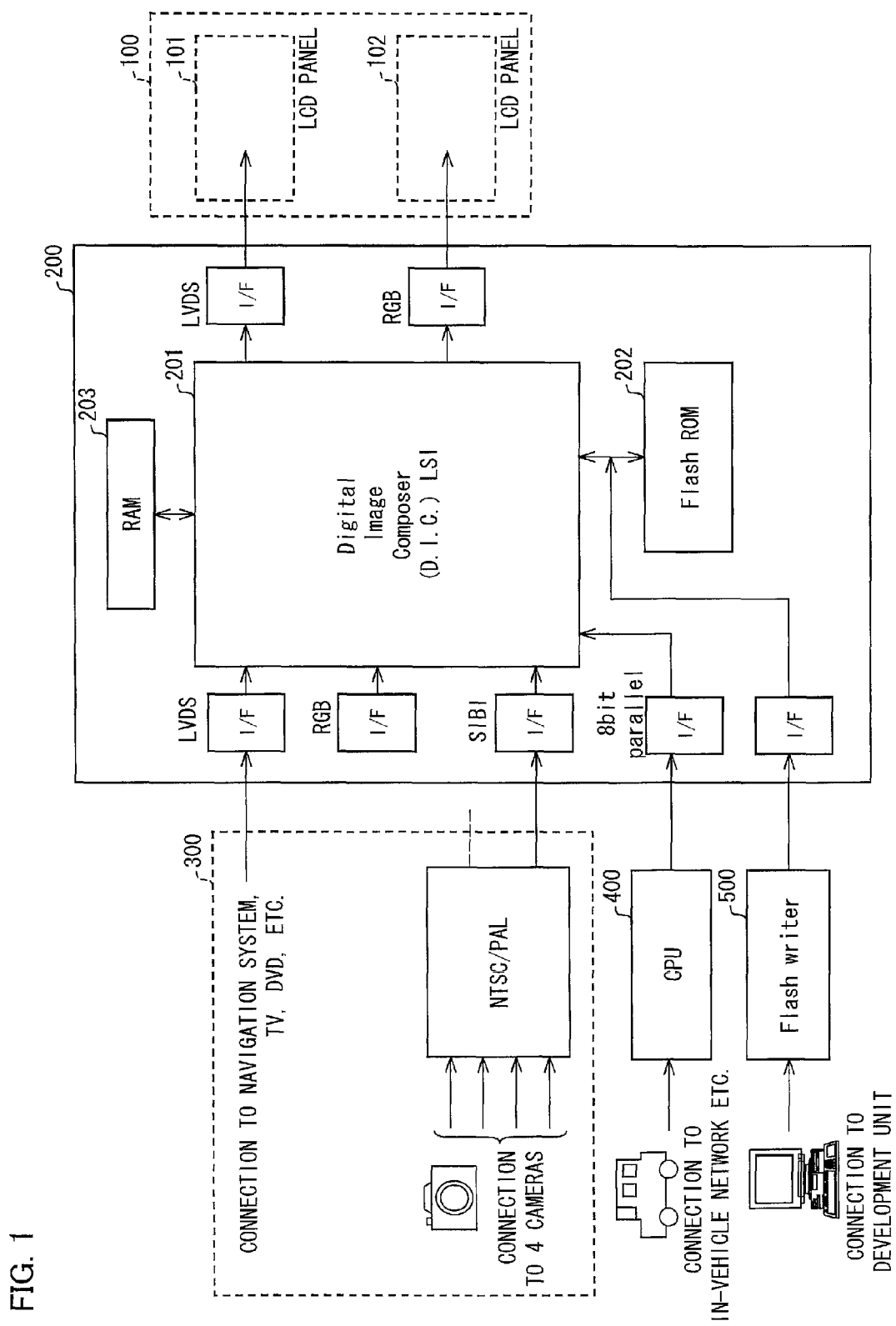
FIG. 1 is a block diagram showing a configuration of a relevant part of a liquid crystal instrument panel system according to an embodiment of the present invention.

FIG. 1 is a block diagram briefly showing the liquid crystal instrument panel system.

As shown in FIG. 1, the liquid crystal instrument panel system includes a liquid crystal display section 100, a liquid crystal platform section 200, an input stream section 300, a CPU 400 and a Flash Writer 500. The liquid crystal instrument panel system loads various moving images made of an NTSC (National Television Standards Committee) signal, a PAL (Phase Alternating Line) signal or an LVDS (Low Voltage Differential Signaling) signal, combines the moving images with an internal static image so as to produce a free layout. Then, the liquid crystal instrument panel system displays in real time an instrument panel image (for example, an image shown in FIG. 4) made of the LVDS signal or an RGB (Red Green Blue) signal.

The liquid crystal display section 100 includes an LCD panel 101 which displays an image according to the LVDS signal and an LCD panel 102 which displays an image according to the RGB signal. The liquid crystal display section 100 may include the LCD panel 101 and the LCD panel 102 separately, or may include one panel which performs both LVDS display and RGB display.

Further, a drive system and a liquid crystal operation mode of the LCD panel 101 and the LCD panel 102 are not particularly limited. The LCD panel 101 and the LCD panel 102 may have any drive system and any liquid crystal operation mode.

The LVDS signal is supplied from the liquid crystal platform section 200 to the LCD panel 101, and the RGB signal is supplied from the liquid crystal platform section 200 to the LCD panel 102. Details of generation of these signals are described later.

The liquid crystal platform section 200 includes a DIC (Digital Image Composer) 201, a Flash ROM 202 and a RAM 203.

The DIC 201 creates an image to be displayed on the liquid crystal display section 100 in accordance with information of the input stream section 300 and information stored in the RAM 203, according to an instruction of the CPU 400. Details of creation of the image in the DIC 201 are described later.

The DIC 201 loads information and outputs an image via various interfaces (I/F) provided in the liquid crystal platform section 200.

In other words, as interfaces for loading information to the DIC 201, the liquid crystal platform section 200 includes: an LVDS I/F for loading information from a navigation system, a TV, a DVD and the like of the input stream section 300; an RGB I/F for obtaining information for an input setting; an SIBI (Stream Input Bus Interface) for obtaining the NTSC signal or the PAL signal from cameras; and an 8-bit parallel I/F for obtaining a control signal from the CPU 400 connected to an in-vehicle network. Further, as interfaces for output of information, the liquid crystal platform section 200 includes: an LVDS I/F for output of the LVDS signal (image information) to the LCD panel 101 and an RGB I/F for output of the RGB signal (text and image information) to the LCD panel 102. Note that the RGB I/F on an output side is for both input and output.

The Flash ROM 202 (first storage section) stores various display data which have different display condition information for images to be displayed on the liquid crystal display section 100. That is, the Flash ROM 202 stores data necessary for display of each scene, in addition to data related to start-up of the liquid crystal instrument panel system.

The RAM 203 (second storage section) includes an SD RAM of a DDR 400, and temporarily stores the display data stored in the Flash ROM 202.

The CPU 400 controls transfer of the display data from the Flash ROM 202 to the RAM 203. That is, the CPU 400 controls the transfer of the display data stored in the Flash ROM 202 so that the data is transferred to the RAM 203 at a predetermined timing.

The DIC 201 creates an image to be displayed on the liquid crystal display section 100 not from the display data stored in the Flash ROM 202 but from the display data transferred to the RAM 203.

The CPU 400 issues a draw command to the DIC 201, and causes the DIC 201 to load necessary display data from the RAM 203 and create the image (instrument panel image) to be displayed on the liquid crystal display section 100.

The DIC 201 has four two-dimensional rotation engines and four animation engines (motion engines). The rotation engines carry out display of an indicator needle. Details of the engines are described later.

The display data to be stored in the Flash ROM 202 is written by the Flash Writer 500. The display data to be written by the Flash Writer 500 is generated in advance as display data by use of layout and static image information and scene transition table information, by a development unit made of a PC (personal computer).

Figure 2:
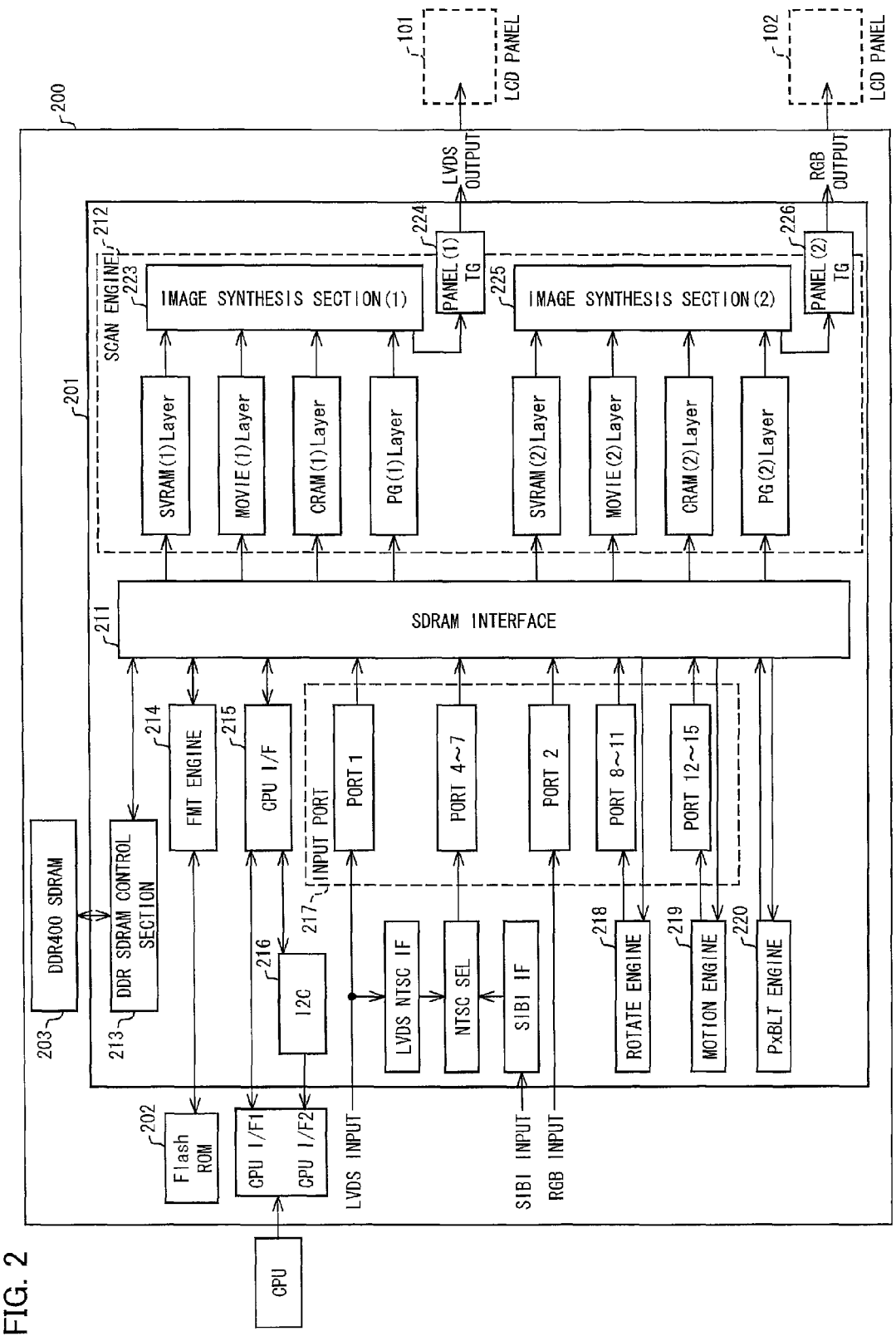
FIG. 2 is a block diagram showing a detailed configuration of a DIC of a liquid crystal platform provided in the liquid crystal instrument panel system shown in FIG. 1.

FIG. 2 is a block diagram showing a detailed configuration of the DIC 201 in the liquid crystal platform section 200.

The DIC 201 includes an SDRAM interface 211 in a center, an SCAN engine 212 provided on a side of data output to the SDRAM interface 211, a DDR SDRAM control section 213, an FMT engine 214, a CPU I/F 215, an I2C 216, an input PORT 217, a ROTATE engine 218, a MOTION engine 219 and a PxBLT (Pixel BLock Transfer) engine 220 each of which is provided on a side of data input into the SDRAM interface 211.

The SCAN engine 212 reads (i) static image data and contents of a CRAM from a display buffer set in the RAM 203 and (ii) pattern data in the RAM 203 and image data from a moving image buffer. Then, the SCAN engine 212 combines (i) the static image data and the contents and separately combines (ii) the pattern data and the image data, for displaying them. Further, the SCAN engine 212 transcribes contents of VRAM and CRAM to the display buffer.

Accordingly, in order to execute the above-described processing, the SCAN engine 212 includes an image synthesis section (1) 223 and an image synthesis section (2) 225 as frame buffers, and a panel (1) TG 224 and a panel (2) TG 226 as output timing gates. Details of the SCAN engine 212 are described later.

The DDR SDRAM control section 213 controls input/output of the display data stored in the RAM 203 according to a control signal transmitted via the SDRAM interface 211.

The FMT engine 214 is a program for reading the display data from the Flash ROM 202 and transferring the read display data to the RAM 203, according to the control signal transmitted via the SDRAM interface 211.

The CPU I/F 215 functions as a direct interface between the SDRAM interface 211 and the CPU 400, and also functions as an interface with the CPU 400 via the I2C 216.

The input PORT 217 has a plurality of PORTs for data input to the SDRAM interface 211.

In the input PORT 217, a PORT 1 is assigned to LVDS input; a PORT 2 is assigned to RGB input; PORTs 4 to 7 are assigned to NTSC input (input of a signal obtained by converting the LVDS into the NTSC, and SIBI input), PORTs 8 to 11 are assigned as PORTs for various signals generated in the ROTATE engine 218, and PORTs 12 to 15 are assigned as PORTs for various signals generated in the MOTION engine 219.

Further, the ROTATE engine 218 and the MOTION engine 219 generate signals, according to the control signal from the SDRAM interface 211. The ROTATE engine 218 and the MOTION engine 219 are described later.

Furthermore, the SDRAM interface 211 controls the PxBLT engine 220.

The PxBLT engine 220 transcribes an image. Specifically, the PxBLT engine 220 has a function to copy a rectangular area in a two-dimensional space to another area or a function to set data in a rectangular area in a two-dimensional space. The present invention further adds, to the PxBLT engine 220, a scaling function and an α blending function so as to extend the function of the PxBLT engine 220.

A signal inputted through the input PORT 217 is outputted to the SCAN engine 212 via the SDRAM interface 211.

The SCAN engine 212 includes: a first layer group (an SVRAM (1) Layer, a MOVIE (1) Layer, a CRAM (1) Layer and a PG (1) Layer) for LVDS output; the image synthesis section (1) 223 for developing a signal from the first layer group into an image; the panel (1) TG 224 for converting the developed image into an LVDS output signal and outputting the LVDS output signal at a predetermined timing; a second layer group (an SVRAM (2) Layer, a MOVIE (2) Layer, a CRAM (2) Layer and a PG (2) Layer) for RGB output; the image synthesis section (2) 225 for developing a signal from the second layer group into an image; and the panel (2) TG 226 for converting the developed image into an RGB output signal and outputting the RGB output signal at a predetermined timing.

In the SCAN engine, indices corresponding to the PG (1) Layer and the PG (2) Layer are set in advance in the CRAM (1) Layer and the CRAM (2) Layer. Image information in accordance with the indices is read from the PG (1) Layer and the PG (2) Layer, and transferred to the frame buffer in the SCAN engine.

The SVRAM (1) Layer and the SVRAM (2) Layer receive image signals generated in the PxBLT engine 220. The MOVIE (1) Layer and the MOVIE (2) Layer receive signals generated in the MOTION engine 219 and the ROTATE engine 218 and image signals from moving image input PORTs. In the SCAN engine 212, indices corresponding to the PG (1) Layer and the PG (2) Layer are set in advance in the CRAM (1) Layer and the CRAM (2) Layer. Image information in accordance with the indices is read from the PG (1) Layer and the PG (2) Layer, and transferred to the frame buffer in the SCAN engine 212.

The image synthesis section (1) 223 is a frame buffer for developing the signal from the first layer group into the image. Similarly, the image synthesis section (2) 225 is a frame buffer for developing the signal from the second layer group into the image.

The panel (1) TG 224 converts the image developed by the image synthesis section (1) 223 into a format (LVDS signal) in which the LCD panel 101 can receive the image, and outputs the signal at a predetermined timing.

The panel (2) TG 226, as with the panel (1) TG 224, also converts the image developed by the image synthesis section (2) 225 into a format (RGB signal) in which the LCD panel 102 can receive the image, and outputs the signal at a predetermined timing.

Figure 3:
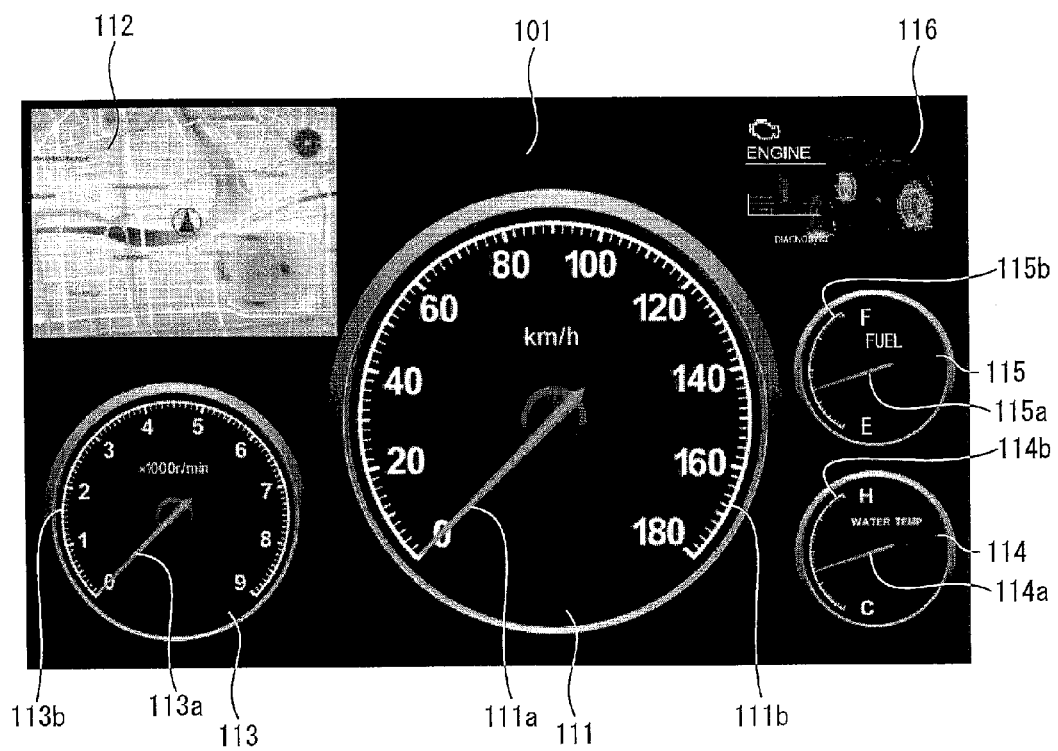
FIG. 3 is a diagram showing a display example of an instrument panel image displayed on a liquid crystal display section of the liquid crystal instrument panel system shown in FIG. 1.

FIG. 3 shows a display example of an image to be displayed on the liquid crystal display section 100. The following describes a display example of an image displayed on the LCD panel 101.

FIG. 3 shows a display example of an instrument panel image of an automobile.

The instrument panel image shown in FIG. 3 is a synthesized image including images of: a speedometer 111 showing running speed of an automobile in a center; a navigation image 112 in an upper left section; a tachometer 113 in a lower left section; a water temperature gauge 114 in a lower right section; a fuel gauge 115 at the middle in the right section; and an engine state 116 in an upper right section.

The ROTATE engine 218 shown in FIG. 2 creates an indicator needle image 111a of the image of the speedometer 111, an indicator needle image 113a of the image of the tachometer 113, an indicator needle image 114a of the image of the water temperature gauge 114 and an indicator needle image 115a of the image of the fuel gauge 115.

The MOTION engine 219 shown in FIG. 2 changes display states of the navigation image 112 and the engine state image 116.

The ROTATE engine 218 is means for creating an image by affine transformation and anti-aliasing. In the present embodiment, the indicator needle images are created at intervals of 30 fps (frame per second). One frame interval is 1/30=0.033 (s)=33 ms.

Therefore, the ROTATE engine 218 generally creates the indicator needle images at intervals of 33 ms in a case of non-interlace display, and, in a case of interlace display, at intervals of approximately 16.7 ms which is a half of each interval of the non-interlace display.

Meanwhile, in the present embodiment, the MOTION engine 219 repeatedly displays 31 images at intervals of 60 ms so as to display the navigation image 112, and also repeatedly displays 105 images at intervals of 30 ms so as to display the I2C 216.

The speedometer 111 is displayed by superposing the indicator needle image 111a created in a transparent mode onto a background image 111b.

The indicator needle image 111a is a display image which is created as an PNG (Portable Network Graphic) image or the like and rotated at a specified angle around a center point of the background image 111b as an axis, in the ROTATE engine 218 shown in FIG. 2.

That is, the speedometer 111 is an analog speedometer. This speedometer 111 displays speed by superposing the indicator needle image 111a that is rotated at the specified angle around the axis that is the center point of the background image 111a onto the background image 111b which has a speed scale from 0 km/h to 180 km/h that is inscribed in a circle. In this way, the speedometer 111 displays a current speed.

Details of a rotation process of the indicator needle image 111a are described later.

The tachometer 113, as with the speedometer 111, is displayed by superposing, onto a background image 113b, the indicator needle image 113a created in the transparent mode by the ROTATE engine 218.

Further, the water temperature gauge 114, as with the speedometer 111, is displayed by superposing, onto a background image 114b, the indicator needle image 114a created in the transparent mode by the ROTATE engine 218.

Furthermore, the fuel gauge 115, as with the speedometer 111, is displayed by superposing, onto a background image 115b, the indicator needle image 115a created in the transparent mode by the ROTATE engine 218.

The navigation image 112 and the engine state image 116 are animation images which sequentially display built-in static images at a specified interval time value. The images are created by the MOTION engine 219 shown in FIG. 2.

The navigation image 112 and the engine state image 116 are such animation images which sequentially display the built-in static images at the specified interval time value. Therefore, smoothness in display of these images is not much required. However, for example, the indicator needle image 111a of the speedometer 111 created in the ROTATE engine 218 is required to be a real-time image and to have smoothness when displayed. This is because, if the rotation of the indicator needle image 111a is not smoothly displayed in the speedometer 111, an operator cannot track the indicator needle image 111a. As a result, the operator may fail to catch a speed change. If the operator fails to catch the speed change as described above, the operator cannot drive safely.

The indicator needle image 111a of the speedometer 111 created in the ROTATE engine 218 is created at one kind of frame intervals (33 ms) as described above, if no adjustment is made. However, such a creation timing of the indicator needle image 111a does not always become identical with a timing (period or transmission intervals) for obtaining vehicle information from the in-vehicle network. Therefore, when the creation timing of the indicator needle image 111a is not identical with the timing for obtaining the vehicle information, a display position of the indicator needle image 111a has a drastic change and the indicator needle image 111a is not smoothly displayed.

The following describes how rotation of the indicator needle image can be smoothly displayed by the ROTATE engine 218. The following describes the display of the rotation of the indicator needle image 111a in the speedometer 111. However, in each of tachometer 113, the water temperature gauge 114 and the fuel gauge 115, the rotation of the indicator needle image is smoothly displayed by the same method as that for the speedometer 111.

FIG. 4 is a diagram for explaining two ways of smoothing of rotation display of an indicator needle image. The alphabet "G" indicates an angle position of a current signal value, and the alphabet "A" indicates an angle position of a last signal value immediately preceding the current signal value.

Display Method 1 is a method in which a half to the angle position of the current signal value is interpolated at a predetermined time interval for moving the angle position of the indicator needle image from "A" to "G". In this case, angle positions "B" to "F" are calculated by expressions shown in FIG. 4. For example, the angle position "B" is calculated by B=A+(G−A)/2. Each angle position is calculated every 16.6 ms. In this case, display is performed without the interpolation.

According to the Display Method 1, the angle position of the indicator needle image moves to "G" which is a target angle position swiftly at first and then the movement of the angle position gradually becomes slower.

Display Method 2 is a method in which evenly divided angle positions are interpolated at a predetermined time interval for moving the angle position of the indicator needle image from "A" to "G". In this case, the angle positions "B" to "F" are calculated by expressions shown in FIG. 4. For example, the angle position "B" is calculated by B=A+(1×Z). The alphabet "Z" is a value calculated by dividing (G−A) by 6 that is the number of interpolations. Each angle position is calculated every 20 ms. The above number of interpolations indicates a case where images can be drawn 6 times at 20 ms intervals.

The Display Method 2 updates the display so that the angle position of the indicator needle image moves evenly to "G" which is the target angle position.

An interval for drawing the indicator needle image is set in accordance with an interval at which the ROTATE engine 218 obtains information regarding the angle position, that is, an interval at which information regarding a speed is transmitted through an in-vehicle network. This allows the rotation of the indicator needle image to be displayed smoothly.

Hereinafter, it is assumed that the smoothing of the rotation display of the indicator needle image is performed in a display system by the Display Method 2.

Figure 5:
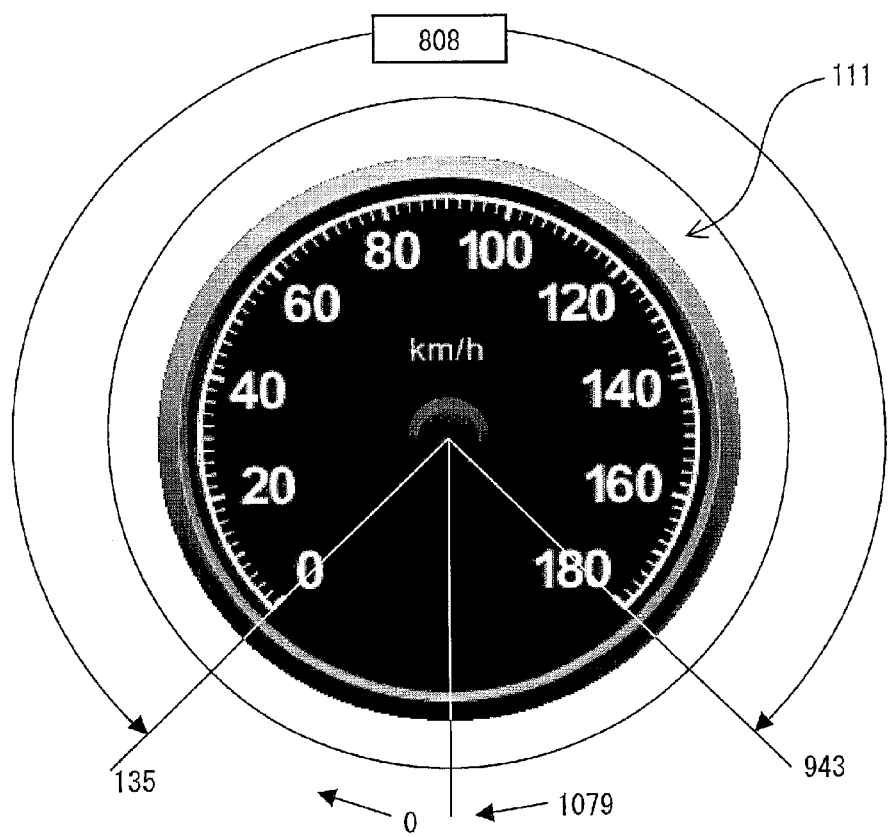
FIG. 5 is a diagram showing degrees of a vehicle speed interval on a speedometer in the instrument panel image shown in FIG. 3, in a case where an angle of 1° in 360° of a circle is evenly divided into three degrees.

FIG. 5 is a diagram showing degrees of a speed interval in a case where an angle of 1° in 360° of a circle is evenly divided into three in the speedometer 111.

In this case, it is assumed that: the speed interval is in a range of 0 km/h to 180 km/h and a total of the degrees is 360°×3=1080; and a degree of 0 km/h is 135 and a degree of 180 km/h is 943. Then, a calculated degree corresponding to a speed can be obtained by the following calculation expression. The calculated degree here indicates the angle position in the speedometer.

Calculated Degree=(808/180)×speed+135.

The CPU 400 carries out an operation of the calculated degree by using a parameter set in advance in the development unit.

That is, the CPU 400 generates a ROTATE command using the calculated degree as an argument, and issues the ROTATE command to the ROTATE engine 218 at a predetermined timing.

The ROTATE engine 218 receives the ROTATE command and calculates an angle position of the indicator needle image, and then outputs the angle position to the SCAN engine 212 via the SDRAM interface 211.

The following describes details of a rotation process by the ROTATE engine 218 and the CPU 400.

Figure 6:
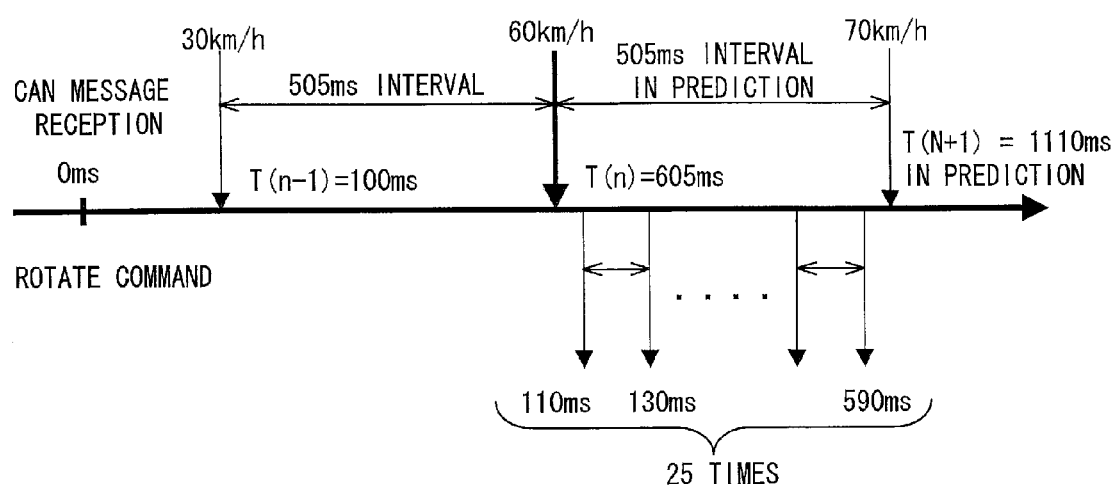
FIG. 6 is a timing diagram showing a relationship between timing of CAN message reception and timing of ROTATE command issuance.

FIG. 6 is a timing diagram showing a relationship between timing of CAN message reception and timing of ROTATE command issuance.

The CAN message is information transmitted through the in-vehicle network, and is transmitted at constant intervals (505 ms intervals). The CPU 400 receives the CAN message transmitted through the in-vehicle network.

FIG. 6 shows a case where the number of times of drawing of an indicator needle (the number of times of interpolation for indicator needle drawing) is determined from a reception interval (505 ms interval) of a CAN message in a case where indication of the CAN message regarding running speed of an automobile (hereinafter referred to as speed) changes from a shift from 30 km/h to 60 km/h to a shift from 60 km/h to 70 km/h.

Specifically, the number of times of drawing and a rotation angle of one time are calculated by the steps (1) to (5).

(1) ROTATE command issuance time interval T (ROT)=# define value=20 ms (2) CAN message reception time interval T (CAN(n))=T (n)−T(n−1)=605−100=505 ms (3) Difference Angle (T(n))=Angle (T(n))−Angle (T(n−1))=Angle of 60 km/h−30 km/hnoAngle=(−135)−(−270)=135

(4) Possible Number of Times (T(n)) of ROTATE command issuance=(2)/(1)=505/20=25 . . . This indicates that 25 times of drawing is possible within 505 ms.

(5) ROTATE command issuance Angle interval (T(n))=(3)/(4)=135/25=5.4 Angle . . . This indicates that the indicator needle rotates by 5.4 Angle in response to one ROTATE command.

FIG. 7 is a diagram showing a concrete example of a ROTATE command issuance according to the number of times of drawing and a rotation angle in response to one ROTATE command. The number of times of drawing and the rotation angle are calculated in FIG. 6.

In other words, in the speedometer 111, in a period for shifting a speed display indicative of 60 km/h to a speed display indicative of 70 km/h, the ROTATE command is issued 25 times, and interpolation is performed in displaying the indicator needle image.

Here, the CPU 400 issues the ROTATE command at 20 ms intervals. Accordingly, if the CAN message reception interval is 505 ms, the CPU 400 stops issuing the ROTATE command for 5 ms and waits for reception of the next CAN message after the CPU 400 issues the ROTATE command 25 times.

Even if the CPU 400 receives the next CAN message later than 505 ms predicted, the CPU 400 keeps the ROTATE command issuance stopped. However, it is conceivable that the CAN message reception interval calculated in (2) is actually very long. Further, for example, it is also conceivable that it takes a long time to receive the next CAN message because of an interruption of communication of the CAN message or a skip of a CAN message. In a case where, as described above, the CAN message reception interval is very long, rotation speed of the indicator needle image becomes slower. As a result, the rotation of the indicator needle image is not displayed smoothly.

For avoiding this problem, a maximum value of the CAN message reception interval is set. Then, when it is determined that the CAN message reception interval is longer than the set maximum value, the rotation process is performed within the maximum value.

For example, a case where the maximum value of the CAN message reception interval is set at 1000 ms is assumed here. If the next CAN message reception supposedly occur not 505 ms later but 1200 ms later and the speed is 100 km/h, the CPU 400 stops receiving the message for 700 ms from 500 ms to 1200 ms.

However, because the CAN message reception interval is over the maximum value of 1000 ms, it is assumed that the speed is shifted from 60 km/h to 100 km/h in 1000 ms after reception of the CAN message. Then, on such an assumption, a shift of the speed is smoothed by 50 times (1000 ms divided by 20 ms) of drawing.

FIG. 8 shows an example of a program in issuing a ROTATE command shown in FIG. 7.

The program is not limited to this program shown in FIG. 8, but may be any program in which the process shown in FIG. 7 is described in an executable manner.

As described above, the liquid crystal instrument panel system of the present embodiment is mounted on an automobile. This liquid crystal instrument panel system includes the liquid crystal display section 100 which displays information regarding the automobile as an image. The liquid crystal display section (image display device) 100 includes: the LCD panels 101 and 102 (image display section) each displaying an image; the liquid crystal platform section 200 (display data generating section) which creates the image to be displayed on the LCD panels 101 and 102 as display data from information obtained from the automobile; the CPU 400 (display position calculating section) which calculates a display position of the image to be displayed on the LCD panels 101 and 102 from the information obtained from the automobile; and the DIC 201 which causes the display data generated by the liquid crystal platform section 200 to be displayed in an image display position calculated by the CPU 400 on the LCD panels 101 and 102, wherein: when an interval at which the information is obtained from the automobile is longer than each of frame intervals for displaying the image on the LCD panels 101 and 102, the DIC 201 updates the image display position of the image so that the image moves at the frame intervals from a start position of image display to the image display position calculated by the CPU 400 from the information currently obtained regarding the automobile, the start position being the image display position having been calculated by the CPU 400 from the information obtained regarding the automobile immediately before the information currently obtained.

Therefore, interpolation display (interpolation) of the image display from the start position to the current display position is performed at the frame intervals on the LCD panels 101 and 102.

Accordingly, because the interpolation is performed, eyes of human being can perceive a display image smoothly moving.

In the description above, the present invention is applied to a rotation process of an indicator needle in each of various rotating meters (mainly, a speedometer) using the ROTATE engine 218. However, the present invention may be applied to bar display processing of various level meters by use of the MOTION engine 219.

The following describes an example in which the present invention is applied to a level meter that displays, in level, a gauge indicating an amount of oil (gasoline) in the liquid crystal instrument panel system.

Figure 9:
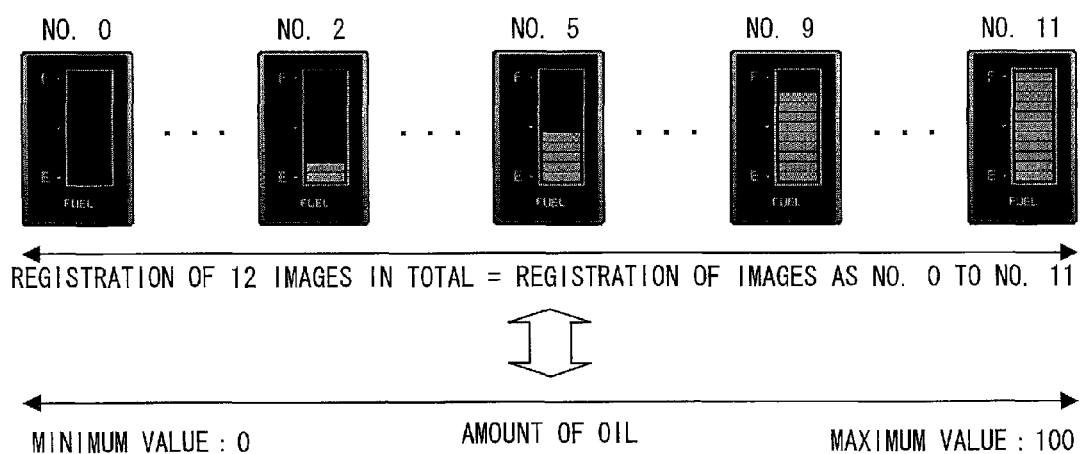
FIG. 9 shows an example which displays, in a level meter, an increased/decreased state of amount of oil.

FIG. 9 shows an example in which a level meter displays an increased/decreased state of amount of oil.

The MOTION engine 219 shown in FIG. 2 performs a display process of the level meter.

The MOTION engine 219 displays an image specified by a command argument, among a plurality of registered static images. The plurality of registered static images are 12 static images to which respective numbers (No. 0 to No. 11) shown in FIG. 9 are appended.

A static image is typically buffered in a static image layer. In this case, it takes 4 frames (for example, if 1 frame=16.6 ms, 16.6 ms×4≈66 ms) after the static image to be displayed is specified and before the static image is displayed.

Meanwhile, in a case where the MOTION engine 219 is used, the static image is buffered in a moving image layer. Accordingly, it takes only 1 frame (for example, if 1 frame=16.6 ms, 16 ms) after the static image to be displayed is specified and before the static image is displayed. This makes drawing faster as compared to drawing with the use of the static image layer.

Further, as shown in FIG. 9, a range of amount of oil values as in-vehicle electronic information is arranged to have a maximum value of 100 indicative of full (F) to a minimum value of 0 indicative of empty (E), and the values are associated with the plurality of static images. In this case, the number given to each static image corresponds to the amount of oil. That is, the static image of No. 0 is a level meter image indicating that the amount of oil is the minimum value, and the static image of No. 11 is the level meter image indicating that the amount of oil is the maximum value.

The number (image number N, N is 0, 1, 2, . . . 10 or 11) given to the static image is calculated as the command argument, from a value corresponding to a detected amount of oil. For example, the number N of an image to be displayed is calculated by the following expression (1).

$$N=12/100 \times \text{amount of oil (a value transmitted through the in-vehicle network, hereinafter referred to as a transmitted value)} \quad (1)$$

The possible values of N are 12 values, i.e. 0, 1, 2, 3, 4, 5, 6, 7, 8, 9, 10 and 11. However, there are more than 12 unprocessed detected values (for example, an electric signal obtained from an oil sensor) for the amount of oil. Therefore, a value indicative of the amount of oil needs to be calculated from the value actually detected so that the actually detected values become 12 values in a parameter set in advance. For example, in a case where a full amount of oil is 60 L, this 60 L is divided into 12 ranges (0 L to less than 5 L, 5 L to less than 10 L, 10 L to less than 15 L, . . . 50 L to less than 55 L and 55 L to 60 L) by evenly dividing 60 L by 5 L. If the actually detected value of the amount of oil is a value in a range of 0 L to less than 5 L, the value is associated with a transmitted value indicating the amount of oil that makes N=0 in the expression (1). Further, if the actually detected value of the amount of oil is a value in a range of 5 L to less than 10 L, the value is associated with a transmitted value indicating the amount of oil that makes N=1 in the expression (1). In this way, the transmitted value is associated with each of all the values of N. Such an operation is performed in advance using the parameter set in accordance with a vehicle (type of vehicle).

As described above, when N indicating the image number is calculated by the expression (1), the MOTION engine 219 buffers, in the moving image layer, the static image of the corresponding image number among the plurality of static images for each of which the calculated N is registered as the command argument. Then, the MOTION engine 219 causes the liquid crystal display section 100 to display the image.

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

The present invention is applicable to gauges, such as a speedometer, each equipped with an image display device which displays an image whose display position changes with time.

The invention claimed is:

1. A display system mounted on a moving body that is controllable, the display system including an image display device displaying, as an image, information regarding the moving body, the image display device comprising:

an image display section displaying the image;

a display data generating section creating the image to be displayed on the image display section as display data, in accordance with the information obtained from the moving body;

a display position calculating section calculating a display position of the image to be displayed on the image display section, from the information obtained from the moving body; and a display control section displaying the display data generated by the display data generating section, in the image display position on the image display section, the image display position calculated by the display position calculating section, the display control section, when an interval at which the information is obtained from the moving body is longer than each of frame intervals for displaying the image on the image display section, updating the image display position of the image so that the image moves at the frame intervals from a start position of image display to the image display position calculated by the display position calculating section from the information currently obtained regarding the moving body, the start position being the image display position having been calculated by the display position calculating section from the information obtained regarding the moving body immediately before the information currently obtained.

2. The display system as set forth in claim 1, wherein:
the display control section updates the image display position so that the image moves by an equal distance from the start position to the image display position calculated by the display position calculating section from the information currently obtained regarding the moving body.

3. The display system as set forth in claim 1, wherein:
the image to be displayed on the image display section is an image which indicates moving speed of the moving body itself.

4. The display system as set forth in claim 3, wherein:
the image is an image which shows an indicator needle of a rotating meter.

5. The display system as set forth in claim 3, wherein:
the image includes a plurality of static images for indicating a level change of a level meter.

6. The display system as set forth in claim 1, wherein:
the image display device is a liquid crystal display device.

7. The display system as set forth in claim 1, wherein:
the moving body is a vehicle.

8. An image display device mounted on a moving body that is controllable, the image display device calculating a display position of an image from information obtained from the moving body and displaying the image in the display position calculated, the image display device comprising:
an image display section displaying the image;
a display data generating section creating the image to be displayed on the image display section as display data, in accordance with the information obtained from the moving body;
a display position calculating section calculating the display position of the image to be displayed on the image display section from the information obtained from the moving body;
a display control section displaying the display data generated by the display data generating section, in the image display position on the image display section, the image display position calculated by the display position calculating section,
the display control section, when an interval at which the information is obtained from the moving body is longer than each of frame intervals for displaying the image on the image display section, updating the image display position of the image so that the image moves at the frame intervals from a start position of image display to the image display position calculated by the display position calculating section from the information currently obtained regarding the moving body, the start position being the image display position having been calculated by the display position calculating section from the information obtained regarding the moving body immediately before the information currently obtained.

9. The image display device as set forth in claim 8, wherein:
the display control section updates the image display position so that the image moves by an equal distance from the start position to the image display position calculated by the display position calculating section from the information currently obtained regarding the moving body.

10. The image display device as set forth in claim 8, wherein:
the image to be displayed on the image display section is an image which indicates moving speed of the moving body itself.

11. The image display device as set forth in claim 10, wherein:
the image is an image which shows an indicator needle of a rotating meter.

12. The image display device as set forth in claim 10, wherein:
the image includes a plurality of static images for indicating a level change of a level meter.

13. The image display device as set forth in claim 8, wherein:
the image display device is a liquid crystal display device.

14. The image display device as set forth in claim 8, wherein:
the moving body is a vehicle.

15. A display control device of an image display device which displays an image to be displayed in an image display position obtained from information obtained from a moving body that is controllable, the display control device being connected to the moving body,
the display control device, when an interval at which the information is obtained from the moving body is longer than each of frame intervals for displaying the image on the image display device, updating the image display position of the image so that the image moves at the frame intervals from a start position of image display to the image display position calculated from the information currently obtained regarding the moving body, the start position being the image display position having been calculated from the information obtained regarding moving body immediately before the information currently obtained.

16. The display control device as set forth in claim 15, updating the image display position so that the image moves by an equal distance from the start position to the image display position calculated by the display position calculating section from the information currently obtained regarding the moving body.

17. The display control device as set forth in claim 15, wherein:
the image to be displayed on the image display device is an image which indicates moving speed of the moving body itself.

18. The display control device as set forth in claim 17, wherein:
the image is an image which shows an indicator needle of a rotating meter.

19. The display control device as set forth in claim 17, wherein:
the image includes a plurality of static images for indicating a level change of a level meter.

20. The display control device as set forth in claim 15, wherein:
the image display device is a liquid crystal display device.

21. The display control device as set forth in claim 15, wherein:
the moving body is a vehicle.

22. An image display device displaying an image whose display position changes with time, the image display device calculating the display position of the image from information obtained regarding the display position and displaying the image in the display position calculated, the image display device comprising:
an image display section displaying the image;

a display data generating section creating the image to be displayed on the image display section as display data, in accordance with the information obtained;

a display position calculating section calculating the display position of the image to be displayed on the image display section, from the information obtained;

a display control section displaying the display data generated by the display data generating section, in the image display position on the image display section, the display position calculated by the display position calculating section, the display control section, when an interval at which the information is obtained is longer than each of frame intervals for displaying the image on the image display section, updating the image display position of the image so that the image moves at the frame intervals from a start position of image display to the image display position calculated by the display position calculating section from the information currently obtained, the start position being the image display position having been calculated by the display position calculating section from the information obtained immediately before the information currently obtained.

23. The image display device as set forth in claim 22, wherein:

the display control section updates the image display position so that the image moves by an equal distance from the start position to the image display position calculated by the display position calculating section from the information currently obtained.

24. The image display device as set forth in claim 22, wherein:

the image is an image which shows an indicator needle of a rotating meter.

25. The image display device as set forth in claim 22, wherein:

the image includes a plurality of static images for indicating a level change of a level meter.

26. The image display device as set forth in claim 22, wherein:

the image display device is a liquid crystal display device.

* * * * *